United States Patent [19]

Jacob et al.

[11] Patent Number: 5,430,722
[45] Date of Patent: Jul. 4, 1995

[54] HYBRID PHOTONIC-ELECTRONIC SUBSCRIBER ACCESS UNIT FOR CONNECTING OPTICAL SUBSCRIBER LINES TO AN ASYNCHRONOUS TRANSFER MODE TELECOMMUNICATION NETWORK

[75] Inventors: Jean-Baptiste Jacob, Perros-Guirec; Jean-Michel Gabriagues, Bullion, both of France

[73] Assignee: Alcatel N.V., Amsterdam, Netherlands

[21] Appl. No.: 197,802

[22] Filed: Feb. 17, 1994

[30] Foreign Application Priority Data

Feb. 18, 1993 [FR] France .................. 93 01844

[51] Int. Cl.[6] .................................. H04J 14/00
[52] U.S. Cl. ........................... 370/60.1; 370/84; 370/94.1; 359/123; 359/125
[58] Field of Search ............ 370/60, 60.1, 84, 94.1; 359/115, 123, 124, 125, 135, 137

[56] References Cited

U.S. PATENT DOCUMENTS

| | | | |
|---|---|---|---|
| 4,873,681 | 10/1989 | Arthurs et al. | 359/123 |
| 4,939,721 | 7/1990 | De Bosio | 370/60 |
| 4,956,839 | 9/1990 | Torii et al. | 370/60 |
| 5,276,676 | 1/1994 | Horn et al. | 370/60 X |
| 5,319,484 | 6/1994 | Jacob et al. | 359/123 |

*Primary Examiner*—Douglas W. Olms
*Assistant Examiner*—Russell W. Blum
*Attorney, Agent, or Firm*—Sughrue, Mion, Zinn, Macpeak & Seas

[57] ABSTRACT

This subscriber access unit includes an electronic subscriber line interface circuit (1) whose functions include: cell header translation, routing label addition and bit rate control (policing). It further includes concentrators (2) including electronic statistical time-division multiplexing devices (34.1, ..., 34.16) and electronic periodic time-division demultiplexing devices (47.1, ..., 47.16) and a photonic wavelength-division multiplexing and bit rate changing device (38), a photonic periodic time-division multiplexing without wavelength-division multiplexing device (40), a photonic bit rate conversion and wavelength-division demultiplexing device (43) and a photonic periodic time-division demultiplexing and wavelength-division multiplexing device (41). This structure optimizes use of photonic technology and electronic technology to achieve a minimal implementation cost.

2 Claims, 6 Drawing Sheets

FIG.6 ns. Instead they are at the input of the switching network and are therefore pooled to process cells incoming on all the subscriber lines connected to one or more concentrators. The means implementing the policing function which monitors the bit rate are also located at the input of the switching network and are also pooled for processing of cells from all subscriber lines connected to one or more concentrators. These policing means can therefore be shared by a large number of subscriber lines, 256 lines, for example.

HYBRID PHOTONIC-ELECTRONIC SUBSCRIBER ACCESS UNIT FOR CONNECTING OPTICAL SUBSCRIBER LINES TO AN ASYNCHRONOUS TRANSFER MODE TELECOMMUNICATION NETWORK

BACKGROUND OF THE INVENTION

The invention concerns a hybrid photonic-electronic subscriber access unit for connecting optical subscriber lines asynchronous transfer mode telecommunication network. Optical subscriber lines convey data in the form of fixed length cells including a header containing routing information.

French patent application no. 2 646 036 describes an entirely electronic digital subscriber access unit including: a control station, an asynchronous transfer mode switching network and a plurality of concentrators for connecting subscriber line terminals, including asynchronous time-division multiplex terminals. Each such prior art concentrator includes a plurality of subscriber line interface circuits and two concentration stages. Each subscriber line interface circuit sends and receives signalling and maintenance cells.

The first concentration stage includes an asynchronous time-division switching matrix controlled by a microprocessor. The second concentration stage includes another asynchronous time-division switching matrix or a time-division multiplexer-demultiplexer controlled by a microprocessor. The structure of this concentrator is optimized for the use of electronic components.

French patent application no. 2 672 175 describes a mainly photonic subscriber access unit. It multiplexes and routes cells using photonic components along all of their path between an input and an output of the subscriber access unit, but these components are controlled by control devices constructed from electronic components. The photonic technology is used for multiplexing, bit rate conversion and routing operations, which require only a small number of components for a given capacity as photonic components can process cells at bit rates of 2.6 Gigabit/second using wavelength-division multiplexing on 16 wavelengths, for example.

This subscriber access unit includes:
a photonic switching network connected to a parent central office;
an electronic control unit connected to a switching network;
a plurality of mainly photonic concentrators connected to the switching network;
mainly photonic subscriber line interface circuits connected to the subscriber lines and to the concentrators, respectively.

Each subscriber line interface circuit performs the following functions in respect of cells incoming on an optical subscriber line:
cell delineation;
descrambling the data field of each cell;
extracting empty cells.

It performs the following functions in respect of cells addressed to a subscriber line:
inserting empty cells;
scrambling the data field;
calculating an error detection word.

The means for translating a virtual circuit label or virtual circuit group label and for attaching a routing label to each cell incoming on a subscriber line are not located in the subscriber line interface circuits or in the concentrators. Instead they are at the input of the switching network and are therefore pooled to process cells incoming on all the subscriber lines connected to one or more concentrators. The means implementing the policing function which monitors the bit rate are also located at the input of the switching network and are also pooled for processing of cells from all subscriber lines connected to one or more concentrators. These policing means can therefore be shared by a large number of subscriber lines, 256 lines, for example.

The number of photonic components in a subscriber access unit constructed in this manner is therefore very significantly reduced as compared with the same design of entirely electronic subscriber access unit, by replacing electronic components with photonic components. This design is therefore highly advantageous for entirely photonic subscriber access units, i.e. subscriber access units with photonic control devices which can process data contained in cells with a bit rate of 2.6 Gb/s without the bit rate causing any problems.

At present the cost of optical logic gates is such that optical processors and high-capacity optical memories cannot be produced at acceptable cost. It is therefore necessary to use electronic processors and memories to implement the functions mentioned above. As this design of subscriber access unit entails carrying out logic operations on cells at a bit rate of 2.6 Gigabits/second it is necessary to convert the bits to be processed to parallel form, in order to change their bit rate, and to use many electronic components in parallel. This increase in the number of electronic components leads to a significant additional cost.

SUMMARY OF THE INVENTION

An object of the invention is to propose a subscriber access unit whose implementation costs are lower than those of that described in French patent application no. 2 672 175 due to a better combination of photonic and electronic technology.

According to the invention, a hybrid photonic-electronic subscriber access unit for connecting subscriber lines to an asynchronous transfer mode telecommunication network, said subscriber lines conveying data in the form of cells including a header containing routing information includes:
an asynchronous transfer mode switching network;
subscriber line interface circuits connected to respective subscriber lines; and
at least one concentrator connecting the switching network to the subscriber line interface circuits;
and is characterized in that the subscriber line interface circuits include:
electronic means for discriminating between empty cells, signalling cells and maintenance cells in the stream of cells from the subscriber lines;
electronic means for translating routing information contained in the headers of the cells from the subscriber lines and writing the translated information into said headers;
electronic means for adding a routing label to the cells from the subscriber lines; and
electronic means for monitoring the bit rate of the cells from the subscriber lines.

This subscriber access unit has a lower implementation cost than the subscriber access unit described in French patent application no. 2 672 175 because the electronic means which are essential for identifying the type of each cell, for translating the routing data and for determining a routing label are located in the subscriber line interface circuit. They therefore benefit from the fact that in these subscriber line interface circuits the bit rate is significantly lower than in the concentration stages: 150 Mb/s or 622 Mb/s rather than 2.5 Gb/s. Electronic technology can carry out these logic operations without needing many electronic components connected in parallel.

According to another feature of the invention the concentrator includes:

means for statistically time-division multiplexing the cells from the subscriber line interface circuits;

photonic means for wavelength-division multiplexing the cells output by the electronic statistical time-division multiplexing means;

photonic means for multiplying the bit rate of the cells output by the wavelength-division multiplexing means; and photonic means for time-division multiplexing without wavelength-division multiplexing the cells output by the bit rate multiplying means.

This subscriber access unit has a lower implementation cost than the subscriber access unit described in French patent application no. 2 672 175 because the logic functions essential for controlling statistical time-division multiplexing can be implemented without using a large number of electronic components in parallel as the means that they control are also implemented in electronic technology and therefore operate at a much lower bit rate than photonic means implementing the same function.

According to a further feature of the invention the electronic statistical time-division multiplexing means include means for increasing the bit rate of each cell in order to provide a guard time between two consecutive cells.

This subscriber access unit enables the use in photonic devices constituting the concentrators of tunable wavelength converters and tunable filters which require some set-up time before they can process each cell. The tunable converters and filters provide particularly advantageous embodiments of the invention.

The subscriber access unit according to the invention thus combines the use of electronic components which are well suited to logic functions at a cost which is at present lower than photonic components implementing the same function in combination with the use of photonic components which have many advantages with regard to multiplexing and switching functions: greater bandwidth, higher speed, and the facility for wavelength-division multiplexing so that the number of components can be reduced.

The invention is explained more fully and other details of the invention emerge in the following description and the accompanying drawing:

DESCRIPTION OF PREFERRED EMBODIMENTS

Figure 1:
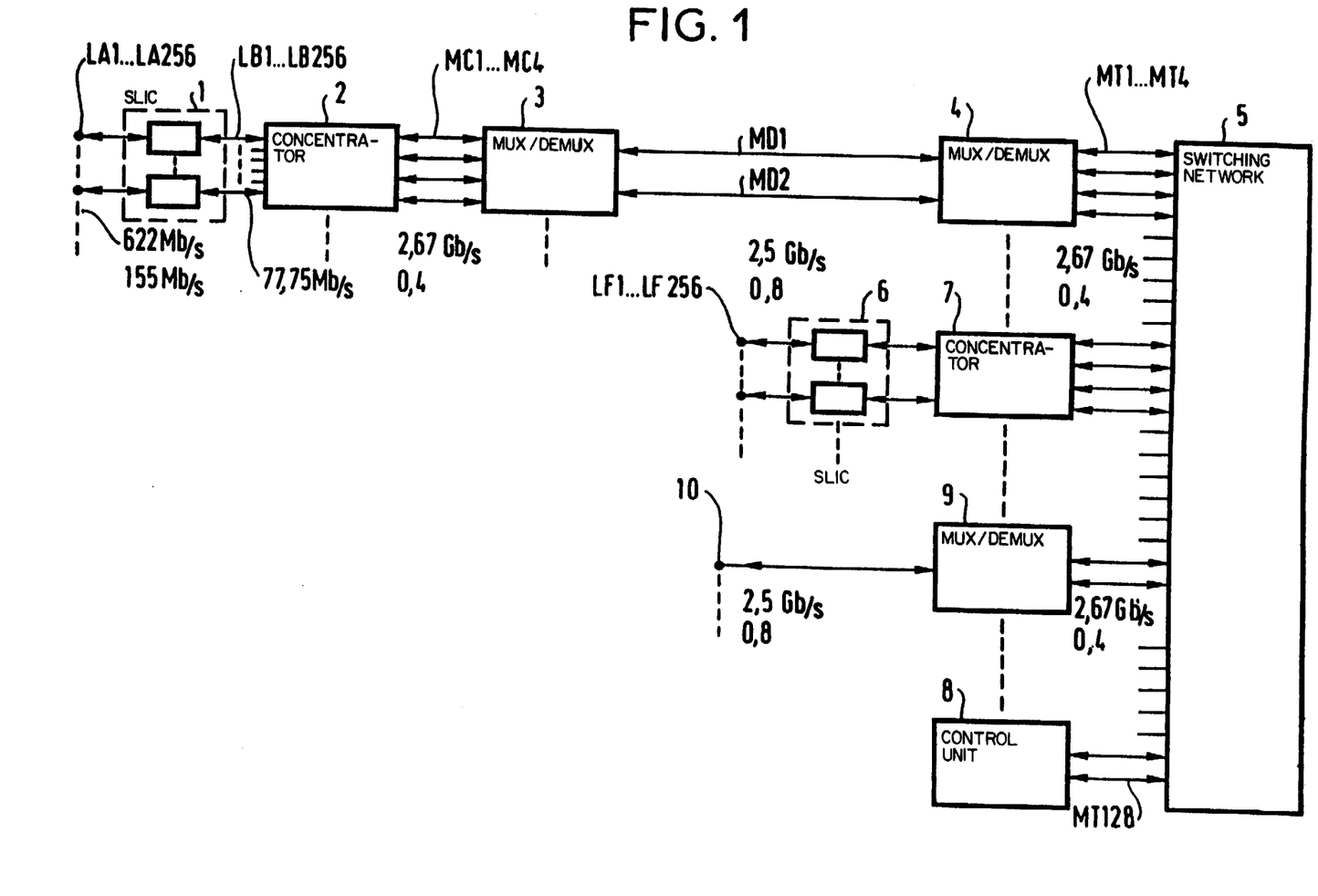
FIG. 1 shows the block diagram of one embodiment of a subscriber access unit according to the invention.

The embodiment shown in FIG. 1 comprises:

terminals LA1, ..., LA256, LF1, ..., LF256 connected to respective subscriber lines sending and receiving data in the form of fixed length cells using asynchronous time-division multiplexing and optical carriers;

subscriber line interface circuits 1 and 6, etc;

concentrators 2, 7, etc;

transmission interfaces 3, 4, etc;

an asynchronous transfer mode switching network 5 having 128 bidirectional ports;

a control unit 8 controlling the switching network 5;

parent central office interfaces 9, etc; and input-output terminals 10, etc, connected by asynchronous time-division multiplexes to a parent central office which is part of the general telecommunication network.

Each subscriber line terminal is connected to a subscriber line interface circuit 1 or 6 by a bidirectional monomode optical fiber at a bit rate of 622 Mb/s or 155 Mb/s. Each interface circuit is connected to an input terminal of a concentrator by an electrical multiplex comprising eight parallel links in each direction with a bit rate of 77.75 Mb/s on each link. The concentrator 2, for example, is connected to 256 subscriber line interface circuits 1 by 256 multiplexes LB1, ..., LB256 comprising eight electrical links in each direction.

There are two categories of concentrator, depending on their distance from the switching network 5. Distant concentrators like the concentrator 2 are connected to the switching network 5 via the multiplexer-demultiplexer 3, two fiber optic lines MD1 and MD2 and a multiplexer-demultiplexer 4. The multiplexer-demultiplexer 3 is located near the concentrator 2 and is connected to it by four bidirectional multiplexes MC1, ..., MC4. The multiplexer-demultiplexer 4 is near the switching network 5 and is connected to it by four bidirectional multiplexes MT1, ..., MT4.

The multiplexes MC1, ..., MC4, MT1, ..., MT4 each convey cells in the form of an optical signal at a bit rate of 2.67 Gb/s and representing a load of 0.4 Erlang. Each is conveyed by one optical fiber in each direction. The lines MD1, ..., MD2 have a bit rate of 2.5 Gb/s and represent a load of 0.8 Erlang, conforming to the standardized characteristics of asynchronous time-division multiplexed fiber optic transport networks.

The multiplexes of the switching network 5 have a bit rate of 2.67 Gb/s and represent a maximal load of 0.4 Erlang. This value is adopted because it enables the benefits of the high speed of photonic technology to be exploited. The reduced load of 0.4 Erlang enables reduction in the size of the buffer memories used in the switching network 5, the reduction in the size of these memories being very substantial on reducing the load from 0.8 Erlang to 0.4 Erlang.

However, the transmission systems connecting the distant concentrators to the switching network 5 must have a maximal load compatible with the optimal use of a link, which is why a load of 0.8 Erlang has been chosen for the lines MD1, ..., MD2.

To exploit the speed of photonic technology the cells are multiplexed onto an optical fiber at 2.67 Gb/s in the final stages of the concentrators 2 and 7. The bit rate is the same for all the concentrators so that they can be identical regardless of their distance from the parent central office. For transmission between a distant concentrator such as the concentrator 2 and the switching network 5 a first transmission interface (3) implements multiplexing with a ratio of 2:1 in respect of cells from a subscriber line terminal and a second transmission interface (4) implements demultiplexing in a ratio of 1:2 on the same cells. The interfaces 3 and 4 naturally implement the converse functions for cells from the switching network 5 and addressed to a subscriber line terminal.

The interface 3 carries out a bit rate reduction from 2.67 Gb/s to 2.5 Gb/s and the interface 4 increases the bit rate in order to match the bit rate of the input-output ports of the multiplexer-demultiplexers 3 and 4 to the standardized bit rate on the lines MD1 and MD2. The interfaces 3 and 4 are as described in French patent application no. 2 672 175. Each of the concentrators near the switching network 5, such as the concentrator 7, is connected direct to the network by four bidirectional multiplexes each at a bit rate of 2.67 Gb/s, representing a load of 0.4 Erlang, and each carried by one optical fiber in each direction. In this example the switching network 5 has 128 bidirectional ports for 128 multiplexes MT1 through MT128 at a bit rate of 2.67 Gb/s and representing a load of 0.4 Erlang.

It enables connection of 16 concentrators, i.e. 4 086 subscriber line terminals. The 16 concentrators use 64 ports of the switching network 5. Two other ports are connected to the control unit 8 by two multiplexers and 62 further ports are connected to 31 multiplexers-demultiplexers providing a link to the parent central office. Of these, only the multiplexer-demultiplexer 9 is shown, by way of example.

The switching network 5 is a photonic network but it is controlled by electronic circuits (the control unit 8), photonic memory technology being at present insufficiently developed for all control electronic circuits to be replaceable by photonic circuits at reasonable cost.

The subscriber access unit is connected to a parent central office of the general telecommunication network. This parent central office uses asynchronous transfer mode but can be implemented in any technology. It can be near or far away from the subscriber access unit. In the latter case the cells must be converted to a form suitable for efficient transmission. Parent central office interfaces like the interface 9 are therefore provided whose first function is to carry out the same multiplexing-demultiplexing and the same bit rate conversion as the transmission interfaces 3, 4; their second function is to prepare cells incoming to the subscriber access unit for routing through the switching network 5 and the concentrators 2 and 7 and to prepare cells outgoing from the subscriber access unit before they are output to the general telecommunication network.

The interface 9 applies time-division multiplexing to cells from the switching network 5, reducing the bit rate from 2.67 Gb/s to 2.5 Gb/s as it eliminates the guard time and the routing label which are needed as far as the output of the subscriber access unit but not thereafter. It increases the load of the outgoing multiplexes from the switching network 5 from 0.4 Erlang to 0.8 Erlang for optimum use of the transmission lines to the general telecommunication network.

The interface 9 applies the converse transformation to cells from the general telecommunication network. It increases the bit rate from 2.5 Gb/s to 2.67 Gb/s by adding to each cell a routing label and eight empty bit periods as a guard time to allow for tuning of the wavelength converters and filters included in the concentrators and the switching network 5. It also converts the routing information contained in the header of each cell and writes the translated information in place of the old data; it adds a routing label to each cell in the gaps introduced between the cells by increasing the bit rate.

The subscriber line interface circuits 1, 6 translate the routing information contained in the header of each cell from a subscriber line and write the translated information in place of the old data. This routing data identifies the virtual circuit allocated to this call on a multiplex for routing the call either to the parent central office of the subscriber access unit or to a multiplex to another subscriber line terminal connected to the same subscriber access unit via the same or another concentrator.

The subscriber line interface circuits 1, 6 add a routing label to each cell in order to route the cell through the switching network 5 and through a concentrator 2, 7, etc in the case of a call between two subscriber line terminals connected to the same subscriber access unit. In this case the routing label includes not only information for routing the cell through the switching stages of the switching network 5 but also routing information for routing the cell through the concentrator to which the destination subscriber line terminal is connected. To route a cell from the switching network 5 to a subscriber line terminal involves switching and not just periodic demultiplexing in the concentrators 2, 7 of cells from the switching network 5 and addressed to a subscriber line terminal. This emerge below in the detailed description of the concentrator 2.

Figure 2:
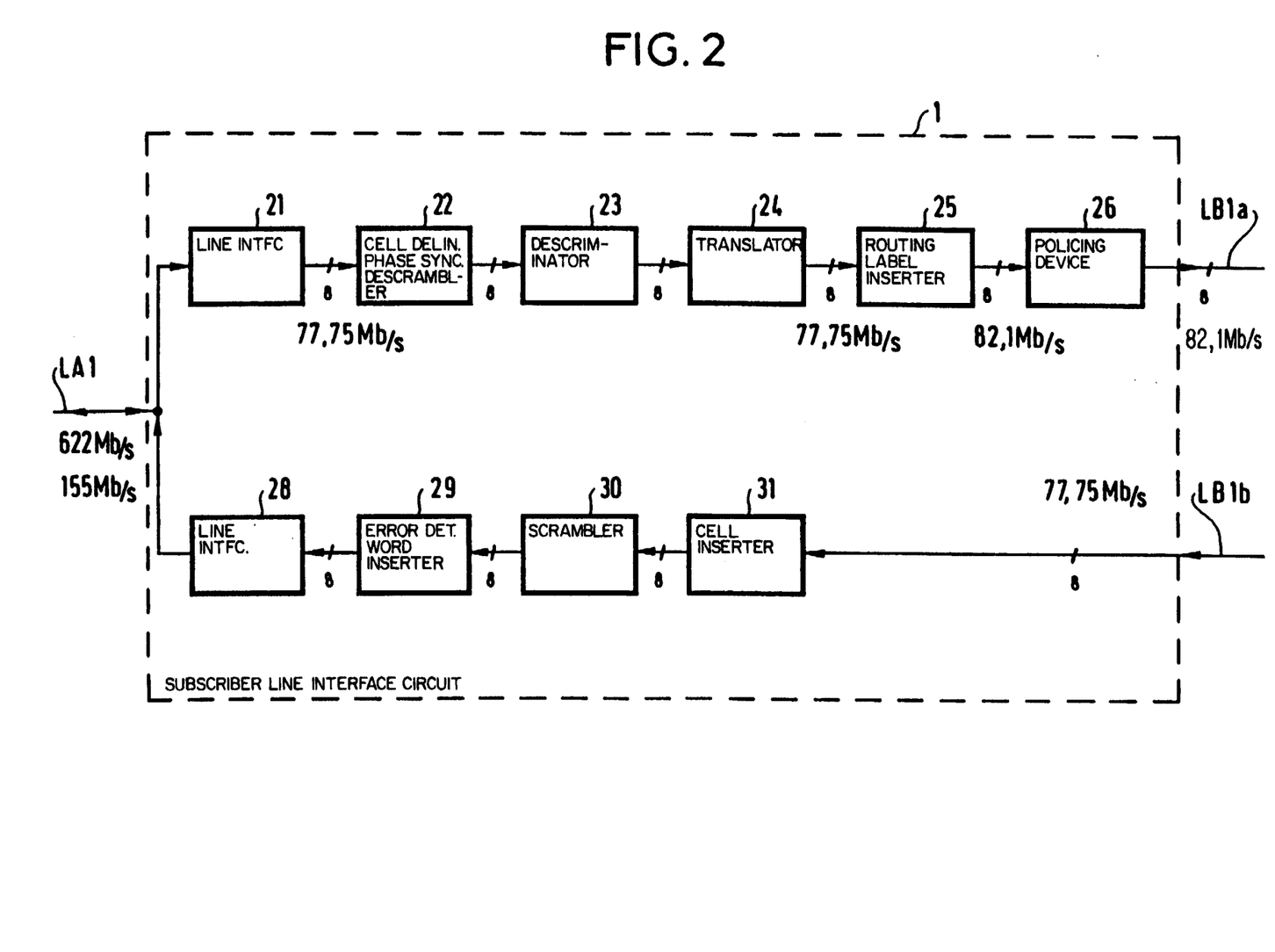
FIG. 2 shows the block diagram of a subscriber line interface circuit included in this embodiment.

FIG. 2 shows the block diagram of one of the subscriber line interface circuits 1. For processing cells from the subscriber line terminals it comprises:

an input-output port connected to an optical subscriber line LA1 sending and receiving cells at a bit rate of 622 Mb/s or 155 Mb/s depending on the subscriber line terminal type;

a mainly electronic line interface 21 implementing optical-to-electrical conversion and parallelization of the bits, byte by byte, to an output comprising eight electrical links;

an electronic device 22 whose functions are: cell delineation using a conventional process, phase synchronization to a local clock and descrambling of the data conveyed by these cells;

an electronic device 23 discriminating between empty cells, signalling cells and maintenance cells;

an electronic device 24 translating routing information contained in the headers of the cells supplied by the device 23;

an electronic device 25 adding to each non-empty cell a routing label including three bytes to be used in the switching network 5 and possibly in a concentrator, the addition of this label increasing the bit rate from 77.75 Mb/s to 82.1 Mb/s;

an electronic device 26 implementing the policing function controlling the bit rate of the cells including the same header in order to check that it conforms to the bit rate negotiated during call set-up for the call corresponding to this header; and a multiplex LB1a outgoing from the circuit 1 and made up of eight electrical links supplying cells byte by byte at a bit rate of 82.1 Mb/s on each link.

For processing cells from the concentrator 2 it comprises:

a multiplex LB1b incoming to the circuit 1 and made up of eight electrical links receiving the cells byte by byte at a bit rate of 77.5 Mb/s on each link, the routing labels having been removed from the cells;

an electronic device 31 having an input receiving the eight bits supplied by the multiplexer LB1b and whose function is to insert empty cells, signalling cells and maintenance cells into the stream of cells addressed to a subscriber line terminal connected to the line LA1;

an electronic device 30 for scrambling the data of the cells supplied by the device 31;

an electronic device 29 for calculating an error detection word from the header of each cell supplied by the device 30 and for inserting this word into that header;

a mainly electronic line interface device 28 for serializing the bits of the cells supplied byte by byte by the device 29 and converting the resulting binary electrical signal into an optical signal which is sent on the subscriber line LA1 by means of a duplexer (not shown) which is shared with the interface 21.

How to implement the devices 21 through 31 will be evident to those skilled in the art. In particular, bit rate control algorithms are described in French patent applications nos. 89 13341 and 89 08193.

Figure 3:
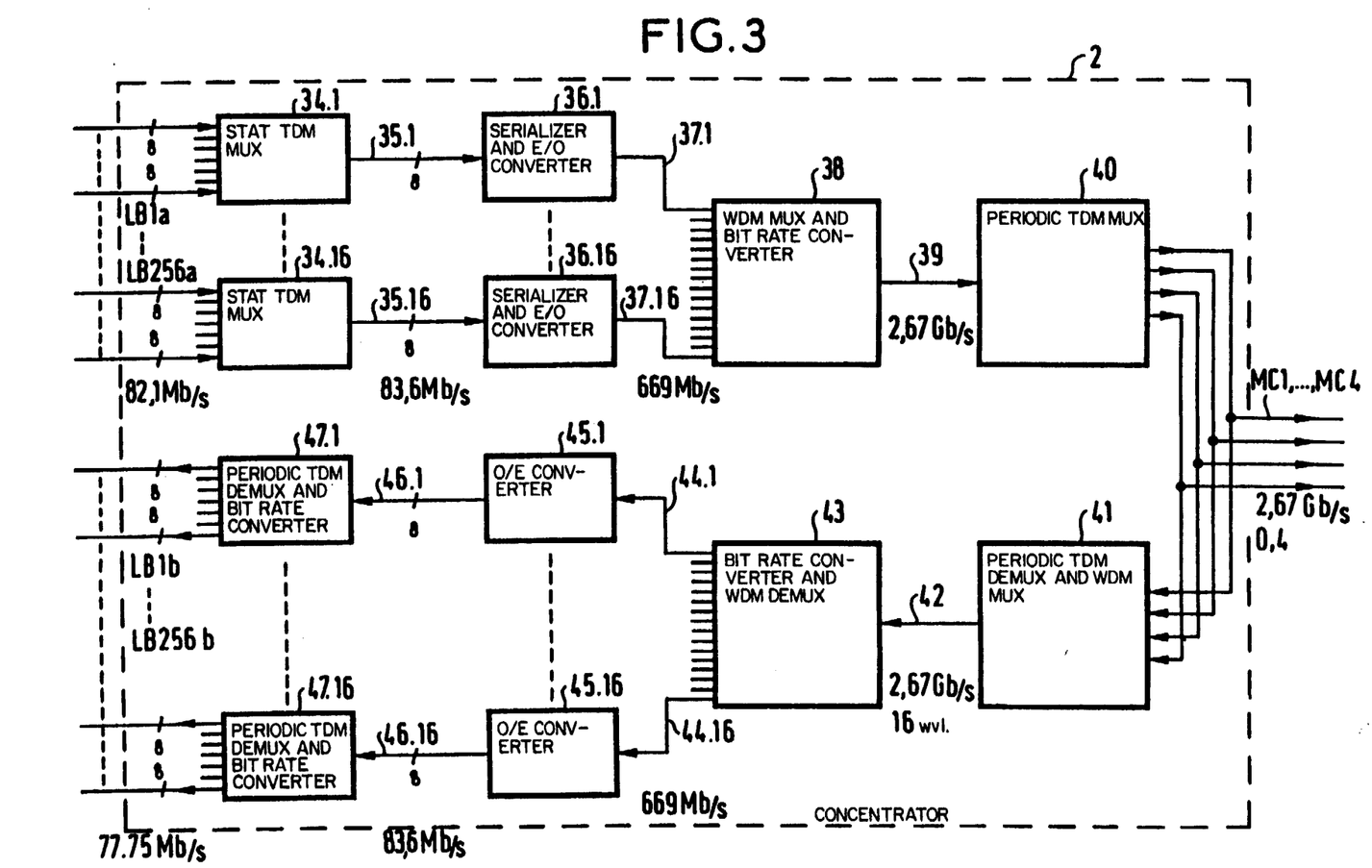
FIG. 3 shows the block diagram of a concentrator included in this embodiment.

FIG. 3 shows a block diagram of a concentrator of this embodiment, the concentrator 2, for example. For processing the cells from the subscriber line interface circuits 1 it includes:

16 electronic devices 34.1, ..., 34.16 for statistical time-division multiplexing of the cells supplied on the multiplexes LB1a, ..., LB256a incoming through the concentrator 2 to effect 16th order concentration and as an ancillary function to modify the bit rate slightly in order to leave a guard time between two consecutive cells; each of these devices receives 16 multiplexes at a bit rate of 82.1 Mb/s and outputs the cells on a single multiplex 35.1, ..., 35.16 made up of eight electrical links in parallel each at a bit rate of 83.6 Mb/s;

16 devices 36.1, ..., 36.16 for serializing the bits of the bytes respectively supplied by the devices 34.1, ..., 34.16 and converting them to an optical signal at any wavelength; this optical signal is supplied to respective optical fibers 37.1, ..., 37.16 at a bit rate of 669 Mb/s;

a photonic device 38 for wavelength-division multiplexing and changing the bit rate of the cells supplied by the devices 36.1, ..., 36.16 and outputting them on a single optical fiber 39 by modulating 16 different wavelengths at a bit rate of 2.67 Gb/s at each wavelength;

a photonic device 40 for periodic time-division multiplexing of the cells supplied by the optical fiber 39 and outputting of them on four optical fibers respectively constituting the bidirectional multiplexes MC1, ..., MC4 at the same bit rate of 2.67 Gb/s but without wavelength-division multiplexing (to prevent the imposition of any specific constraint on the next stage, which is the switching network 5).

To process the cells from the transmission interface 3 it comprises:

a photonic device 41 for periodic time-division demultiplexing and then wavelength-division multiplexing of the cells received over the four multiplexes MC1, ..., MC4 from the switching network 5 and then outputting them on a single optical fiber 42 at the same bit rate of 2.67 Gb/s but modulating 16 different wavelengths;

a photonic device 43 for changing the bit rate of the cells supplied by the optical fiber 42, wavelength-division demultiplexing them and then outputting the cells on 16 separate optical fibers 44.1, ..., 44.16 at a bit rate of 669 Mb/s each;

16 mainly electronic devices 45.1, ..., 45.16 for converting into binary electrical signals the binary optical signals respectively supplied by the fibers 44.1, ..., 44.16 and converting them to an electrical signal on eight bits in parallel supplied to an electrical output 46.1, ..., 46.16 at a bit rate of 83.6 Mb/s for each bit;

16 electronic devices 47.1, ..., 47.16 for periodically time-division demultiplexing the cells supplied by the outputs 46.1, ..., 46.16 and for adjusting the bit rate to 77.75 Mb/s by eliminating the routing label bits and the guard time; each device 47.1, ..., 47.16 has 16 outputs each supplying eight bits in parallel to one of the output multiplexes LB1b, ..., LB256b of the concentrator 2 addressed to 256 subscriber line interface circuits 1 which are responsible for reconstituting the cells by serializing the bits and converting them to optical form.

The wavelength-division multiplexing carried out in the device 38 enables use of the same bit rate conversion means for 16 cells received simultaneously and wavelength-division multiplexed onto 16 different wavelengths. The device 38 therefore enables maximum benefit to be drawn from the high bit rate capabilities of photonic technology. As wavelength-division multiplexing cannot be retained in the switching network 5, the device 40 replaces the wavelength-division multiplexing on 16 wavelengths by periodic time-division multiplexing on the four multiplexes MC1, ..., MC4 on which the cells can be conveyed at any wavelength, the latter being no longer indicative of wavelength-division multiplexing.

The device 41 effects periodic time-division multiplexing by virtue of the fact that the switching network 5 supplies cells in an order such that they can be time-division demultiplexed by simple periodic time-division demultiplexing. These cells are then wavelength-division multiplexed onto 16 different wavelengths so that the 16 cells can be processed simultaneously by the bit rate converter device 43. In this way a single bit rate converter device 43 can process all the cells addressed to 256 subscriber lines.

The devices 45.1, ..., 45.16 convert the cells into the form of eight electrical signals in parallel for processing by electronic devices. Thus it is possible to use entirely electronic periodic time-division demultiplexing devices 47.1, ..., 47.16. The devices 47.1, ..., 47.16 are described in more detail below and include a relatively large number of memory locations, which is why it is advantageous to implement them in electronic technology.

Thus the photonic bit rate converter devices 38 and 43 are shared by 256 subscriber lines. The electronic devices 34.1, ..., 34.16, 47.1, ..., 47.16 effect time-division multiplexing and demultiplexing corresponding to concentration and deconcentration in a ratio of 1/16 at a more reasonable cost than if photonic memories and control means were to be used for these multiplexing and demultiplexing operations.

The devices 36.1 through 36.16 and 45.1 through 45.16 are conventional and how to implement them will be evident to those skilled in the art.

The wavelength-division multiplexer and bit rate converter device 38, the periodic time-division multiplexer device 40, the bit rate converter and wavelength-division demultiplexer device 43 and the periodic time-division demultiplexer followed by wavelength-division multiplexer device 41 can be implemented as disclosed in French patent application no. 2 672 175.

Figure 4:
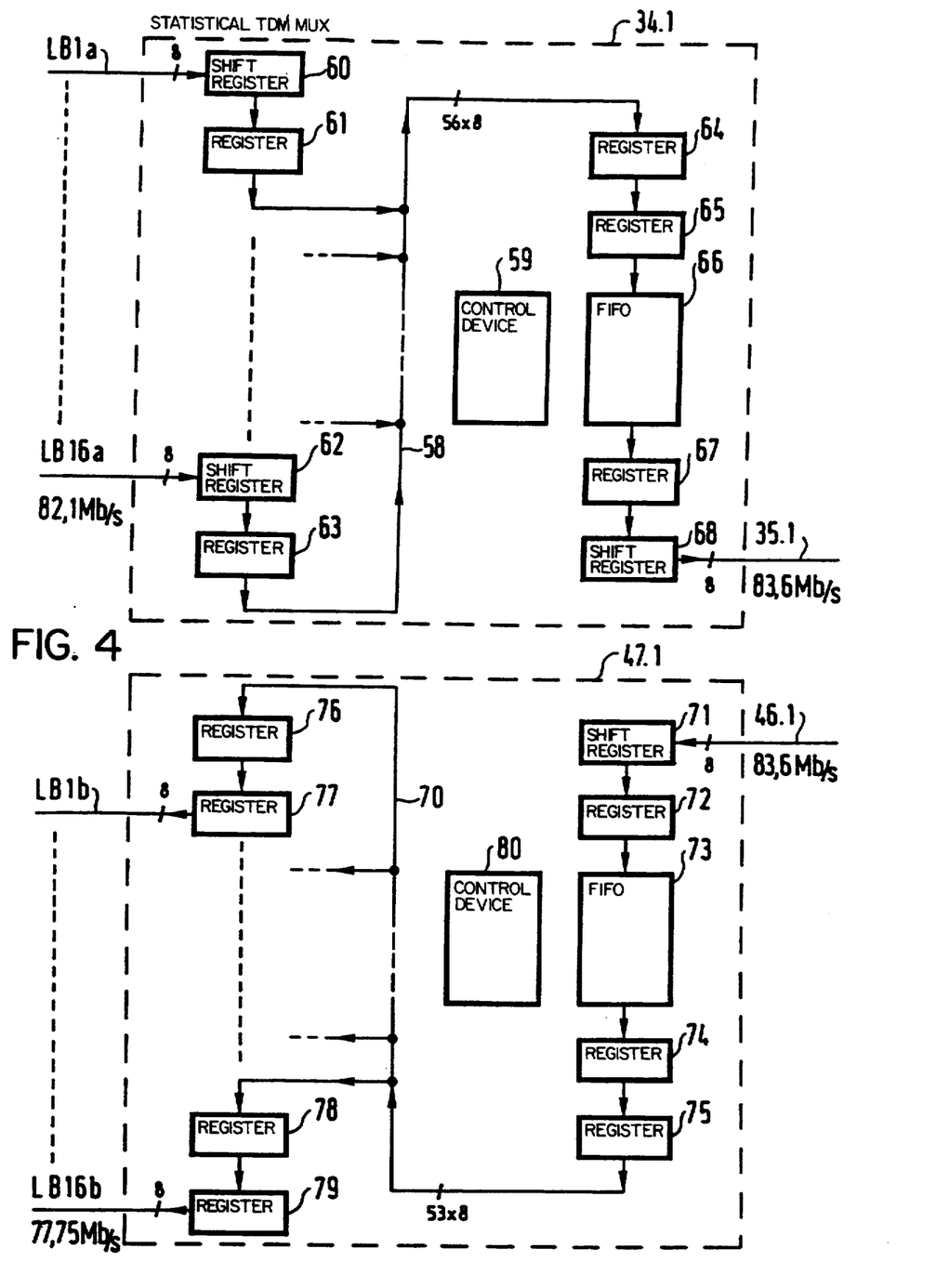
FIG. 4 shows the block diagram of part of this concentrator.

FIG. 4 shows by way of example a more detailed block diagram of the devices 34.1 and 47.1. The device 34.1 carries out statistical time-division multiplexing and increases the bit rate from 81.2 Mb/s to 83.6 Mb/s by inserting a guard time equal to eight bit periods between consecutive cells.

Each multiplex LB1a, . . . , LB256a is connected to one input of a shift register whose input receives eight bits in parallel and whose output provides 56 bytes in parallel. This shift register is used to combine in a single register all the bits constituting one and the same cell. For example, the multiplex LB1a is connected to the shift register 60 and the multiplex LB256a is connected to the shift register 62. The output of each of these shift registers is made up of 56×8 bits in parallel and is connected to a 56×8-bit input of a shift register providing access to a bus 58 comprising 56×8 conductors in parallel. The shift registers 60 and 62 access the bus 58 via respective registers 61 and 63, for example.

The bus 58 is connected to a first in/first out type memory 66 by a register 64 for reading the bus 58 and a register 65 for writing the memory 66; an input of the register 65 is connected to an output of the register 64 and an input of the memory 66 is connected to an output of the register 65. The registers 64 and 65 have a capacity of 56 bytes, representing a cell complete with its routing label. The memory 66 includes 32 registers each having a capacity of 56 bytes, for example, so that it is not saturated if all 16 inputs connected to the multiplexes LB1a, . . . , LB16a receive a cell simultaneously.

Each output of the memory 66 is connected to the output of the device 34.1, i.e. to the multiplex 35.1, by a register 67 for reading the memory 66 and a shift register 68. The registers 67 and 68 have a capacity of 56 bytes. The register 67 stores in a single block the 56 bytes which are read from the memory 66. The register 68 stores in a single block the 56 bytes contained in the register 67 and then outputs them to the multiplex 35.1 byte by byte.

The device 34.1 further includes a control device 59 connected by links (not shown) to clock inputs of the registers 60 through 65 and 67, 68; it is connected to write control inputs and read control inputs of the memory 66. The control device 59 controls these registers and this memory 66 in order to write the cells into the memory 66 as and when they are received, at a bit rate of 1.46 Mb/s when a cell arrives, possibly assigning them a priority dependent on the rank of the input LB1a, . . . , LB16a which received each cell, and to read the cells stored in the memory 66 continuously and at a constant bit rate of 1.49 Mb/s. The cells are sent successively, byte by byte, on the link 35.1 at a bit rate of 83.6 Mb/s on each of the eight bits of the multiplex and with a guard time equal to the time to transmit a byte between two consecutive cells.

The device 47.1 carries out periodic time-division demultiplexing and bit rate conversion. It receives cells over the multiplex 46.1 in the form of blocks of eight bits in parallel at a bit rate of 83.6 Mb/s for each bit. It outputs the cells on the 16 multiplexes LB1b, . . . , LB16b each including eight electrical links in parallel, the bit rate on each link being 77.75 Mb/s. The bit rate difference represents the elimination of the three routing label bytes and the guard times which in this example represent one byte.

The multiplex 46.1 is connected to an input of a shift register 71 which has an input for eight bits in parallel. The register 71 has an output supplying 53×8 bits in parallel to an input of a register 72. This register 72 has a capacity of 53 bytes representing a cell without its routing label and is used to write a cell into a first in/first out type memory 73. The memory 73 has a capacity of 32 cells. It has a 53×8-bit output connected to a register 74 for reading the memory 73. The register 74 has a capacity of one cell and has an output connected to the input of a register 75 which also has a capacity of one cell. The register 75 has a 53×8-bit output connected to a bus 70. The register 75 is used to send on the bus 70 each cell read in the memory 73.

Each of the multiplexes LB1b, . . . , LB16b is connected to an output of a shift register consisting of eight bits in parallel. The capacity of this register represents one cell and is used to convert each cell into 53 successive bytes. The multiplexes LB1b and LB16b, for example, are connected to respective outputs of registers 77 and 79. The register 77 has an input connected to an output of a register 76 supplying 53×8 bits in parallel. An input of the register 79 is connected to an output of register 78 supplying 53×8 bits in parallel. The register 76 is used to read on the bus 70 each cell addressed to the multiplex LB1b. The register 78 is used to read on the bus 70 each cell addressed to the multiplex LB16b.

The device 47.1 further includes a control device 80 connected to clock inputs of the registers 71, 72 and 74 through 79 by links (not shown) and connected to write and read control inputs of the memory 73 by links (not shown). The control device 80 controls the shift register 71 in order to write into the latter 53 of the 56 bytes representing each cell incoming on the link 46.1. The three bytes representing the routing label are not written into the register 71 and are thus eliminated. Likewise, no writing is done during a time period representing one byte and constituting the guard time between consecutive cells. It writes the cells into the memory 73 at the bit rate of 1.58 Mb/s and reads them at the rate of 1.47 Mb/s. The capacity of the memory 53 is equal to 16 cells, for example.

This capacity depends on the traffic load and how to choose its value will be evident to those skilled in the art.

In an alternative embodiment the guard time can be implemented in the labelling device 25 which is located in the subscriber line circuits, at the same time as the adjustment required for labelling.

Figure 5:
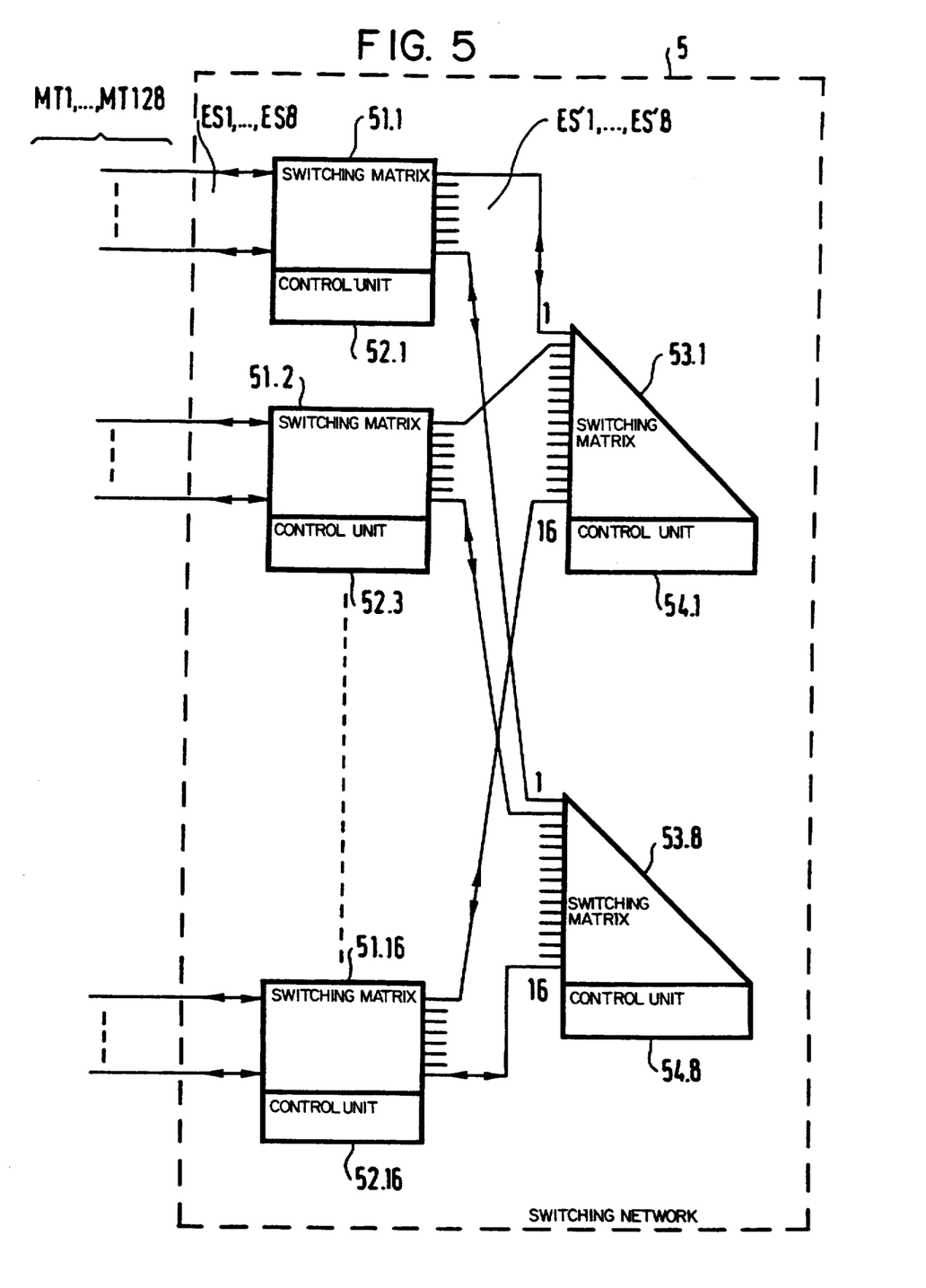
FIG. 5 shows the block diagram of a photonic switching matrix included in this embodiment.

FIG. 5 shows the block diagram of one embodiment of the switching network 5. It comprises 24 identical 16×16 switching matrices, 16 of which, matrices 51.1, . . . , 51.16, are used in a configuration with 8×8 bidirectional ports to constitute simultaneously first and third switching stages and eight of which, matrices 53.1, . . . , 53.8, are used in a folded configuration to provide 16 input-output ports and constitute a second switching stage.

The multiplexes MT1, ..., MT128 are grouped into groups of eight multiplexes connected to eight respective input-output ports ES1, ..., ES8 of one of the 16 matrices 51.1, ..., 51.16. The input-output ports ES1, ..., ES8 correspond to the rows of the matrices 51.1, ..., 51.16. Each of these matrices 51.1, ..., 51.16 is associated with a respective electronic control unit 52.1, ..., 52.16 which includes a microprocessor. The matrices 51.1 through 51.16 each further includes eight input-output ports ES'1, ..., ES'8 corresponding to the columns of these matrices and connected to eight input-output ports of the matrices 53.1 through 53.8 as follows: the ith input-output port of the matrix 53.j is connected to the jth input-output port corresponding to a column of the matrix 51.i with i varying from 1 to 8 and j varying from 1 to 16. Each of the matrices 53.1 through 53.8 is associated with a respective control unit 54.1 through 54.8 analogous to the control units 52.1 through 52.16.

When it enters the switching network 5 each cell comprises a header on five bytes followed by 48 information bytes. The header includes an identifier which identifies the virtual circuit of a subscriber, an identifier which identifies a virtual circuit group combining a plurality of virtual circuits, where applicable, and an error detection word relating to the header. Routing in each switching stage, including in the switching matrices of the switching network 5, is carried out with reference to the routing label added to each cell. In the subscriber access unit according to the invention this label is inserted at the subscriber line interface circuits 1 and 6 or at the multiplexer-demultiplexer 9.

In this embodiment the switching matrices of the switching network 5 are matrices with 16 outputs. Determining the routing at each switching stage requires four bits. Routing is via a maximum of five switching stages, and so the routing label must include at least 20 bits. There is therefore provision for adding a label comprising three bytes (24 bits) before the header of each cell. This produces cells including a greater number of bits and consequently a bit rate of 2.60 Gb/s in the network 5. Adding guard times between consecutive cells yields a final bit rate of 2.67 Mb/s. The routing labels are eliminated and the bit rate reverts to the initial bit rate of 2.5 Gb/s in the concentrators 2 and 7 and also in the multiplexers-demultiplexers 9 which constitute a transmission interface to a parent central office of the general telecommunication network.

The function of the switching network 5 is not only to route each cell to a multiplex connected to the concentrator to which that cell is addressed but also to change the order of the cells outgoing on each multiplex so that the device 41 of a concentrator 2 or 7 can time-division demultiplex them by simple periodic time-division demultiplexing. Two bits in the routing label specify the order of the cells in a group of four cells on a multiplex.

The bits of the routing label are read in the control units 52.1 through 52.16 and 54.1 through 54.8 associated with the matrices 51.1 through 51.16 and 53.1 through 53.8. These control units route and delay the cells in the queues of the matrices according to the routing label bits. The two bits which identify the order of the cells are allocated to the cells in such a way that they identify the order in which the cells must be output from the switching network 5.

The photonic switching networks 51.1, ..., 51.16 and 53.1, ..., 53.8 and their control units 52.1, ..., 52.16 and 54.1, ..., 54.8 are described in French patent application no. 2 672 175.

Figure 6:
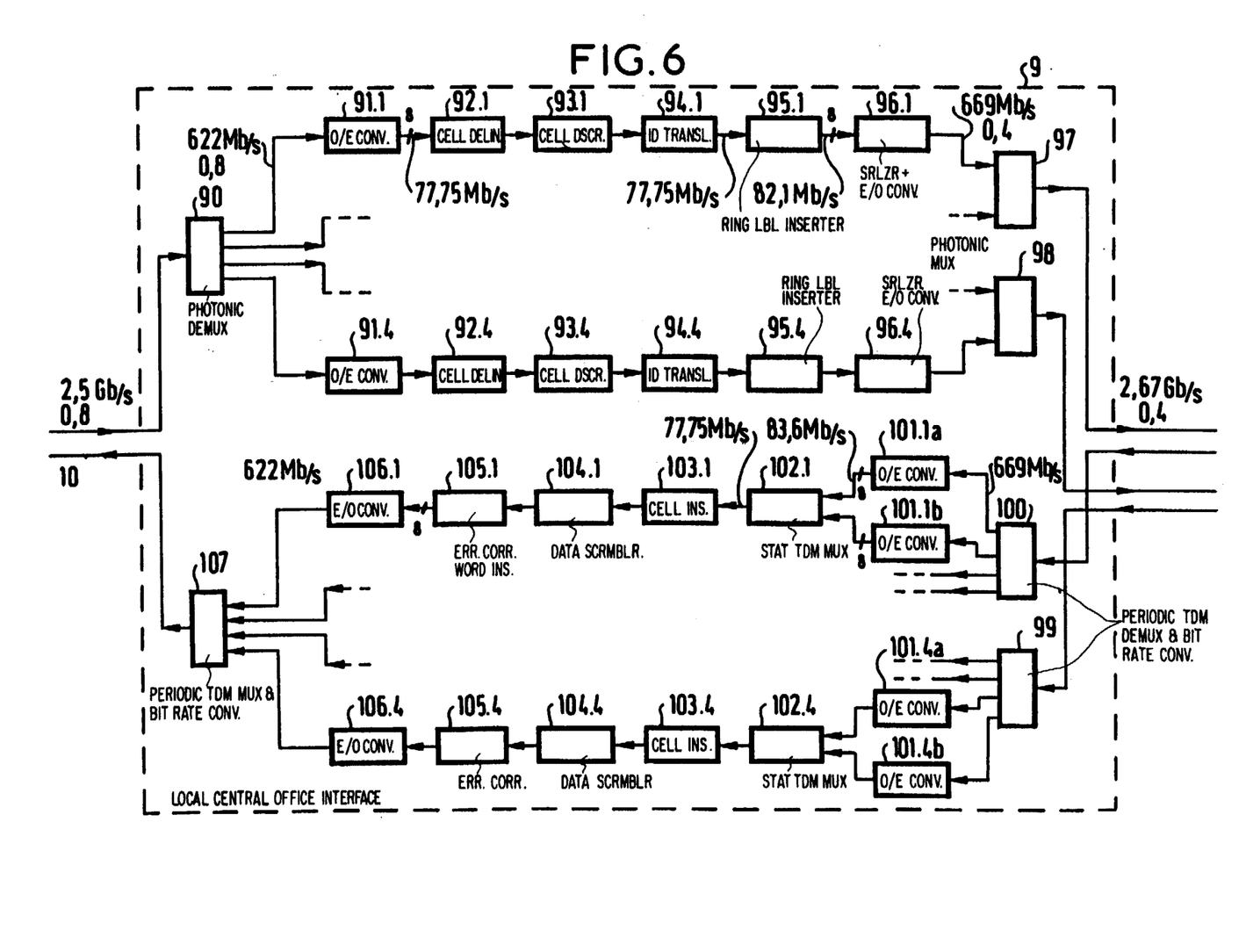
FIG. 6 shows the block diagram of an interface included in this embodiment for connection to a parent central office.

FIG. 6 shows the block diagram of one embodiment of the parent central office interface 9. It includes a first part for processing cells from the general telecommunication network addressed to the switching network 5. This part includes:

a photonic demultiplexer 90 for periodically time-division demultiplexing the cells at bit rate of 2.5 Gb/s and distributing them between four optical fibers at a bit rate of 622 Mb/s;

four series of devices working in parallel and connected to respective output optical fibers of the demultiplexer 90;

two photonic multiplexers 97 and 98 each having two inputs and one output, the multiplexer 97 having two inputs respectively connected to an output of the first series and an output of the second series, the multiplexer 98 having an input connected to an output of the third series and an input connected to an output of the fourth series; the demultiplexer outputs 97 and 98 being respectively connected to two output links of the two multiplexes connecting the interface 9 of the switching network 5.

The demultiplexer 90 effects periodic time-division demultiplexing and bit rate conversion to transmit to each of the series of circuits one in four cells, representing a load of 0.8 Erlang. It is a photonic demultiplexer implemented in the technology disclosed in French patent application no. 2 672 175.

The multiplexers 97 and 98 are also photonic devices and effect periodic time-division multiplexing and bit rate conversion from 622 Mb/s (0.8 Erlang) to 2.67 Gb/s (0.4 Erlang) on the cells. They can be implemented as disclosed in French patent application no. 2 672 175.

The four series of devices are identical. The reference numbers of the devices constituting them are differentiated by the subscripts 1 through 4.

For example, the first series of devices includes:

an essentially electronic device 91.1 for converting an optical signal at a bit rate of 622 Mb/s into an electrical signal comprising eight bits in parallel at a bit rate of 77.75 Mb/s for each bit;

an electronic device 92.1 for delineating the cells supplied by the device 91.1, synchronizing their phase to a local clock and descrambling the data that they contain;

an electronic device 93.1 for discriminating between signalling cells, maintenance cells and empty cells;

an electronic device 94.1 for translating the virtual circuit identifier and the virtual circuit group identifier of the cells and substituting the translation for the initial value of these identifiers;

an electronic device 95.1 for adding to each cell a routing label, modifying the bit rate of the cells to allow the insertion of the routing labels and the creation of a guard time corresponding to eight bit periods between consecutive cells, so that the bit rate increases from 77.75 Mb/s to 82.1 Mb/s for each of the eight bits in parallel;

a mainly electronic device 96.1 for serializing the signal received in the form of eight bits in parallel and converting it to an optical signal at a bit rate of 669 Mb/s.

The device 90 is similar to the combination of the devices 41 and 43 of the concentrator 2. It can therefore be implemented as described in French patent application no. 2 672 175. The devices 97 and 98 are each analogous to the combination of the devices 38 and 40 of the concentrator 2. They can therefore be implemented as disclosed in French patent application no. 2 672 175.

The devices 92 are analogous to the device 22 of the concentrator 2. The devices 93 are analogous to the device 23 of the concentrator 2. The devices 94 are analogous to the device 24 of the concentrator 2. The devices 95 are analogous to the device 25 of the concentrator 2. How to implement the devices 92, 93, 94, 95 in the electronic technology will be evident to those skilled in the art.

A second part of the interface 9 processes the cells incoming from the switching network 5 and outgoing to the general telecommunication network. This part includes:

two photonic devices 99 and 100 for periodically time-division multiplexing and changing the bit rate of the cells supplied by the switching network 5 at a bit rate of 2.67 Gb/s representing a load of 0.4 Erlang; each of these devices includes four outputs which output the cells at a bit rate of 669 Mb/s representing a load of 0.4 Erlang;

four series of devices working in parallel and described below; and a photonic device 107 for periodically time-division multiplexing and changing the bit rate of the cells supplied by the four series of circuits, the cells being output on a single optical fiber at a bit rate of 2.5 Gb/s representing a load of 0.8 Erlang.

The four series of devices are identical. The reference numbers of the devices constituting them are differentiated by the subscripts 1 through 4. For example, the first series includes:

two devices 101.a and 101.b each having an input connected to an output of one of the devices 99 and 100 and each having one output; their function is to convert an optical binary signal into an electrical signal comprising eight bits in parallel at a bit rate of 83.6 Mb/s for each bit;

an electronic device 102.1 for statistically time-division multiplexing the cells received from two devices such as the devices 101.a and 101.b, changing the bit rate from 83.6 Mb/s to 77.75 Mb/s, this statistical multiplexing effecting concentration from a load of 0.4 Erlang on two multiplex to a load of 0.8 Erlang on one multiplex only;

an electronic device 103.1 for inserting signalling cells, maintenance cells and empty cells into the stream of cells supplied by the device 102.1;

an electronic device 104.1 for scrambling the data of the cells;

an electronic device 105.1 for calculating an error detection word relating to the header of each cell and inserting this word into the cell; and an essentially electronic device 106.1 for converting the electrical signals comprising eight bits in parallel into a binary optical signal, the bit rate increasing from 77.75 Mb/s to 622 Mb/s.

The device 107 has only to effect periodic time-division multiplexing and a change of bit rate to output to the general telecommunication network cells at a bit rate of 2.5 Gb/s representing a load of 0.8 Erlang.

The devices 101a, 101b and 106 are respectively analogous to the devices 21 and 28 of the subscriber line interface circuit and how to implement them will be evident to those skilled in the art. The devices 102 are analogous to the device 34.1 previously described with reference to FIG. 4. The devices 103 are analogous to the device 31 of the subscriber line interface circuit 1.

The devices 35 are analogous to the device 29 of the subscriber line interface circuits 1. The devices 105 are analogous to the device 29 of the subscriber line interface circuits 1. The devices 92 are analogous to the device 22 of the subscriber line interface circuits 1. The devices 93 are analogous to the device 23 of the subscriber line interface circuits. The devices 94 are analogous to the device 25 of the subscriber line interface circuits 1. The devices 95 are partially analogous to the device 25 of the subscriber line interface circuits 1, but in addition to determining and inserting a routing label, they add a guard time between the cells.

The functions implemented by all these devices are conventional in electronic asynchronous transfer mode switching centers and how to implement them will therefore be evident to those skilled in the art.

The scope of the invention is not restricted to the embodiment described above. The subscriber access unit of the invention can easily be adapted by those skilled in the art for connection to subscriber lines or to a parent central office sending and receiving cells in electrical form.

We claim:

1. A hybrid photonic-electronic subscriber access unit for connecting subscriber lines to an asynchronous transfer mode telecommunication network comprising a plurality of hybrid photonic-electronic subscriber access units, said subscriber lines conveying data in the form of cells including a header containing routing information, said access unit comprising:

an asynchronous transfer mode switching network (5);

a plurality of subscriber line interface circuits (1, 6) connected to respective subscriber lines;

at least one concentrator (2, 7) connecting the switching network (5) to the subscriber line interface circuits (1, 6); and said subscriber access unit being characterized in that each of the subscriber line interface circuits (1, 6) comprises:

electronic means (23) for discriminating between empty cells, signalling cells and maintenance cells in a stream of cells from the subscriber lines;

electronic means (24) for translating routing information contained in the headers of the cells from the subscriber lines and writing tile translated information into said headers;

electronic means (25) for adding a routing label to the cells from the subscriber lines; and electronic means (26) for monitoring the bit rate of the cells from the subscriber lines;

and in that said concentrator (2, 7) comprises:

electronic means (34) for statistically time-division multiplexing the cells from the subscriber line interface circuits (1);

photonic means (38) for wavelength-division multiplexing the cells output by the electronic statistical time-division multiplexing means, and for multiplying the bit rate of the cells that have been wavelength-division multiplexed; and photonic means (40) for time-division multiplexing the cells whose bit rate has been multiplied.

2. The subscriber access unit according to claim 1 characterized in that the electronic statistical time-division multiplexing means (34) include means (34.1, . . . , 34.16) for increasing the bit rate of each cell in order to leave a guard time between two consecutive cells.

* * * * *